United States Patent [19]

Roller et al.

[11] Patent Number: 4,534,999

[45] Date of Patent: Aug. 13, 1985

[54] PRODUCTION OF MAGNETIC RECORDING MEDIA HAVING A BACKING COATING

[75] Inventors: Hermann Roller, Ludwigshafen; August Lehner, Roedersheim-Gronau; Joachim Hack, Ludwigshafen; Werner Grau, Bobenheim-Roxheim; Werner Balz, Limburgerhof; Reinhold Baur, Offenburg, all of Fed. Rep. of Germany

[73] Assignee: BASF Aktiengesellschaft, Fed. Rep. of Germany

[21] Appl. No.: 630,182

[22] Filed: Jul. 12, 1984

[30] Foreign Application Priority Data

Jul. 15, 1983 [DE] Fed. Rep. of Germany ....... 3325556

[51] Int. Cl.$^3$ ............................................... H01F 10/02
[52] U.S. Cl. ..................................... 427/130; 427/128
[58] Field of Search ................. 427/127–132, 427/48

[56] References Cited

U.S. PATENT DOCUMENTS

| | | | |
|---|---|---|---|
| 3,209,054 | 9/1965 | Englisch | 260/861 |
| 3,293,066 | 12/1966 | Haines | 117/68 |
| 3,649,358 | 3/1972 | Johnston | 427/57 |
| 4,058,646 | 11/1977 | Vaeth et al. | 428/425 |
| 4,135,031 | 1/1979 | Akashi et al. | 428/323 |
| 4,320,171 | 3/1982 | Motz et al. | 428/423.1 |

FOREIGN PATENT DOCUMENTS 1197661 7/1970 United Kingdom .

*Primary Examiner*—Bernard D. Pianalto
*Attorney, Agent, or Firm*—Keil & Weinkauf

[57] ABSTRACT

Magnetic recording media which have a thin backing coating and consist of a non-magnetic flexible base and a magnetic layer which is applied to one side of the base and comprises magnetic material finely dispersed in an organic binder are produced by applying a dispersion of finely divided non-magnetizable conductive and non-conductive solids and conventional additives in a solution of a polymeric binder in an organic solvent to that side of the base which is opposite the magnetic layer by means of a knife-coater, and then drying the layer, a high molecular weight organic compound which acts as a thickener being added to the backing coating dispersion.

3 Claims, No Drawings

PRODUCTION OF MAGNETIC RECORDING MEDIA HAVING A BACKING COATING

The present invention relates to a process for the production of magnetic recording media which have a thin backing coating and consist of a non-magnetic flexible base and a magnetic layer which is applied to one side of the base and comprises magnetic material finely dispersed in an organic binder, by applying a dispersion of finely divided non-magnetizable conductive and non-conductive solids and conventional additives in a solution of a polymeric binder in an organic solvent to that side of the base which is opposite the magnetic layer by means of a knife-coater, and then drying the layer.

It is known that flexible magnetic recording media can be provided with a backing coating containing non-magnetizable non-conductive and/or conductive substances.

U.S. Pat. No. 3,293,066 discloses that static electricity on magnetic tapes, which in the case of digital tape recorders of the reel-to-reel type can be produced at tape speeds above 5 m/sec, can be eliminated by applying a conductive backing coating, which in turn makes the back of the tape more hard-wearing. Furthermore, British Pat. No. 1,097,661 and U.S. Pat. No. 4,135,031 disclose that the winding properties of the tapes can be improved by applying a backing coating possessing a predetermined surface roughness. Such backing coatings are also known for magnetic cards. Finally, German Pat. No. 2,500,546 discloses that backing coatings are also advantageous for video tapes.

In the latter case, the backing coating has the added advantage that it reduces the number of errors during playback. Depending on the type of tape, the backing coatings are applied in a thickness of from 0.2 to 5.0 $\mu$m, in particular from 0.4 to 1.2 $\mu$m. In order to produce such thin layers, it is necessary to greatly dilute the dispersions prepared by dispersing finely divided, non-magnetizable conductive and non-conductive solids in one or more organic solvents and binders, ie. the dispersions used to produce backing coatings contain a relatively large amount of solvent and accordingly have a low viscosity. Although the addition of solvent increases the shrinkage factor, ie. the ratio of the gap between the knife of a knife coater and the base material to the thickness of the dry layer, it has the disadvantage that the viscosity is greatly reduced and hence the operation of applying the dispersion to the base can no longer be controlled. Furthermore, the presence of an excessively large amount of solvent generally makes the dispersion unstable.

The majority of the conventional binders, such as polyacrylates, nylons, cellulose nitrates, polyesters, polurethanes, phenoxy resins, vinyl chloride/acrylonitrile copolymers and vinyl chloride/vinyl acetate/vinyl alcohol copolymers are hard and brittle. However, the mechanical stress to which the backing coatings are subjected necessitates a flexible formulation. Hence, polyurethane elastomers are frequently combined with relatively brittle polymers, such as phenoxy resins, vinyl chloride, vinyl acetate copolymers, polycarbonates, etc., but combinations of the latter binders in particular cannot be diluted beyond a certain point.

It is an object of the present invention to provide a process which does not have the above disadvantages and permits the production of magnetic recording media which possess a backing coating of particularly uniform thickness, by applying a dispersion of finely divided, non-magnetic, conductive and non-conductive material in a solution of a polymeric binder to the base with the aid of a knife-coater. Despite being thin, the backing coating must also be homogeneous and mechanically very stable, i.e. it must be capable of withstanding the stresses imposed on it by modern recording/reproducing apparatus.

We have found that this object is achieved, and that even thin non-magnetic conductive or non-conductive backing coatings can be produced using a knife-coater, if from 3 to 30% by weight, based on the amount of polymeric binder, of a high molecular weight compound which causes the dispersion to exhibit elastico-viscous to thixotropic flow behavior is added to the dispersion.

Particularly suitable high molecular weight organic compounds are nitrocellulose having a K value greater than 75, in particular greater than 90, preferably from 100 to 200, and high molecular weight reaction products, such as cellulose acetobutyrates, cellulose acetates and cellulose propionates, which achieve a K value greater than 75, in particular greater than 90, preferably from 100 to 200, as a result of reaction with a diisocyanate or polyisocyanate. In this reaction, the size of the molecule increases as a result of crosslinking via the OH groups of the cellulose molecules.

The high molecular weight organic compounds added to the dispersion in accordance with the novel process are used in the stated amount, preferably in an amount of from 5 to 20% by weight, based on the amount of polymeric binder in the dispersion.

The binders are chosen from those conventionally used for the production of magnetic recording media. These include nylon copolymers which are soluble in the usual solvents, polyvinylformals, polyurethane elastomers, mixtures of polyisocyanates and relatively high molecular weight polyhydroxy compounds or vinyl chloride polymers containing more than 60% of vinyl chloride units, eg. a vinyl chloride copolymer with one or more comonomers, such as a vinyl ester of a monocarboxylic acid of 2 to 9 carbon atoms, or an ester of an aliphatic alcohol of 1 to 9 carbon atoms and an ethylenically unsaturated carboxylic acid of 3 to 5 carbon atoms, such as the esters of acrylic acid, methacrylic acid or maleic acid, or a copolymer of vinyl chloride with one or more of these carboxylic acids themselves as comonomers, or hydroxyl-containing vinyl chloride copolymers which can be prepared by partial hydrolysis of vinyl chloride/vinyl ester copolymers or direct copolymerization of vinyl chloride with hydroxyl-containing monomers, such as allyl alcohol or 4-hydroxybutyl acrylate or methacrylate or 2-hydroxyethyl acrylate or methacrylate. Other suitable binders are mixtures of one or more polyurethane elastomers with polyvinylformals, phenoxy resins and vinyl chloride copolymers of the above composition. Preferred binders are polyurethane elastomers having a K value (1% strength in dimethylformamide) as high as 75, as described, inter alia, in German Published Applications DAS No. 1,106,955 and DAS No. 2,753,694 and German Laid-Open Application DOS No. 2,442,762, as well as polyvinylformal binders which are prepared in a conventional manner by hydrolyzing a polymer of a vinyl ester and then reacting the vinyl alcohol polymer with formaldehyde. They advantageously contain not less than 65, in particular not less than 80, % by weight of vinylformal groups. Very suitable polyvinylformals contain from 5 to 13% by weight of vinyl alcohol groups, from 7 to 15% by weight of vinyl acetate groups and from 80 to 88% by weight of vinylformal groups and have a specific gravity of about 1.2 and a K value (1% strength in dimethylformamide) of 60±5. Mixtures of binders, in particular mixtures of the two last-mentioned binders, are also very useful.

Preferred solvents for the preparation and processing of the polymers are cyclic ethers, such as tetrahydrofuran and dioxane, and ketones such as methyl ethyl ketone and cyclohexanone. The polyurethanes can of course also be dissolved in other strongly polar solvents, such as dimethylformamide, pyrrolidone, dimethyl sulfoxide or ethylene glycol acetate. The said solvents can also be mixed with aromatics, such as toluene or xylene, or esters, such as ethyl acetate or butyl acetate.

The backing coating dispersion is advantageously prepared using dispersants, such as fatty acids of the general formula $R^1$—COOH, where $R^1$ is straight-chain or branched alkyl or alkylene of 10 to 22 carbon atoms, salts of the metals of main groups I to III of the periodic table of elements with the said carboxylic acids, or lecithin. It has proven useful to add an amount of from 2 to 3% by weight, based on the pigment.

Suitable lubricants for adjusting the frictional properties are the conventional products, such as fatty acid esters of mono- and dicarboxylic acids, fatty acid amides or silicone oils. It is advantageous to add an amount of about 1% by weight, based on the binder.

To adjust the surface roughness of the backing coating and to reinforce it, zinc oxide, titanium dioxide, $\alpha$-$Fe_2O_3$, calcium carbonate, barium sulfate, corundum, chromium trioxide, silicates, etc. are used as fillers. Depending on the use, eg. in the audio or video sector, it has also proven advantageous to employ either a silica which has been treated with an organic substance and has a mean agglomerate size of about 4 $\mu$m, or a precipitated silica having a mean secondary particle size of about 3 $\mu$m, together with a cubic zinc ferrite. The binder/pigment ratio of the backing coating can vary from 1:1 to 4:1, preferably from 1.5:1 to 2.5:1. The conductive carbon used in the layer is, for example, carbon black which is obtained from an oil-fired furnace and has a specific surface area of about 200 $m^2/g$, an oil number of 185 ml/100 g and a carbon content of 98% by weight. It is also possible to use carbon blacks having a larger surface area (as high as 1000 $m^2/g$) or a smaller surface area (as low as 100 $m^2/g$), or mixtures of these. If binders or binder mixtures are used to which reactive polyisocyanates have been added before or during application of the backing coating dispersion to the base, heating the backing coating can improve durability. The abrasion resistance of the novel backing coatings can be further improved, and their thermoplasticity reduced, in particular if a polyisocyanate, preferably one obtained from di- or triisocyanatodiphenylmethane and 1 mole of a triol, such as a glycerol or 1,1,1-trimethylolpropane, in particular the reaction product of 3 moles of toluylene diisocyanate and 1 mole of 1,1,1-trimethylolpropane, is added to the finished dispersion, preferably before it is applied to the base. The amount of polyisocyanates added for this purpose is in general about 10–40% by weight, based on the total amount of binder. The crosslinking reaction is advantageously accelerated by adding a catalyst, for example by adding a tertiary amine, such as triethylamine, triethylenediamine, N-methylpyridine or N-methylmorpholine, a metal salt, such as potassium acetate or zinc stearate, or an organic metal compound, such as dibutyltin dilaurate.

Advantageously, the 0.2–5.0 $\mu$m thick backing coating consists of from 20 to 35, preferably from 20 to 30, % by weight of a conductive cabon, from 5 to 15, preferably from 8 to 12, % by weight of a pyrogenic or precipitated silica, from 2 to 8, preferably from 3 to 6, % by weight of a cubic zinc ferrite, from 0.5 to 5, preferably from 1 to 3, % by weight of a long-chain carboxylic acid of 10 to 22 carbon atoms and from 30 to 50, preferably from 35 to 45, % by weight of the polymeric binder mixture, with or without from 10 to 40, preferably from 20 to 40, % by weight of a polyisocyanate resin.

The dispersion is prepared in a conventional manner in a ball mill, e.g. a vertical or horizontal stirred ball mill. The backing coating is preferably applied by means of a knife-coater. The solvent is evaporated and the backing coating is dried and, if an isocyanate resin is present, cured by passing the coated web through a tunnel dryer. Moreover, it is possible to apply the magnetic dispersion and the backing coating dispersion either in one operation or in succession, ie. first the magnetic layer and then the backing coating, or vice versa. The coated films can, if required, be calendered on conventional machines having polished rollers optionally heated to from 50° to 100° C., preferably from 60° to 80° C. The thickness of the backing coating is less than 5 $\mu$m, preferably from 0.4 to 1.4 $\mu$m.

The novel process makes it possible to produce thin homogeneous backing coatings which are ≦1 $\mu$m thick but nevertheless exhibit only small variations in thickness. We have found that dispersions having a viscosity of from 15 to 200, preferably from 20 to 50, mPa.s are particularly suitable, the solids/solvent ratio in this case being not less than 1:25. Very advantageous solids/solvent ratios are those above 1:30 or even 1:36, up to an upper limit of 1:40. A particular advantage of the novel process is that a flexible base can be coated by means of a knife-coater to give a backing coating whose shrinkage factor, ie. the ratio of the gap between the knife and the base material (hereinafter referred to as "casting gap") to the thickness of the dry backing coating, is greater than 10, preferably from 15 to 35.

The flexible magnetic recording media with a backing coating produced according to the invention are distinguished from prior art magnetic recording media in particular by the fact that the backing coating dispersions can be applied in very thin layers having the abovementioned thicknesses, and video tapes produced in this manner exhibit substantially fewer errors.

The Examples which follow illustrate the invention; the Comparative Experiments illustrate the state of the art. In the Examples and Comparative Experiments, parts and percentages are by weight, unless stated otherwise.

EXAMPLE 1

8000 parts of steel balls having a diameter of 4–6 mm and 90 parts of a conductive carbon having a specific surface area of 200 $m^2/g$, 45 parts of silica treated with an organic compound and having a mean agglomerate size of 4 $\mu$m, 15 parts of a cubic zinc ferrite, 3 parts of stearic acid, 420 parts of tetrahydrofuran, 219 parts of a 13% strength solution, in tetrahydrofuran, of a linear polyesterurethane resin prepared from adipic acid, butane-1,4-diol and 4,4'-diisocyanatodiphenylmethane, and 234.4 parts of an 8% strength solution, in tetrahydrofuran, of nitrocellulose having a K value of 110, were introduced into a ball mill having a capacity of 6000 parts by volume, and the ball mill was then closed and the mixture milled for 4 days. To determine the rheological properties, a sample of the dispersion was taken from the mill. The viscosity was 374 mPa.s and the yield value was 40.5 Pa. The ball mill was then opened once again, 834.4 parts of the 13% strength solution of the above linear polyesterurethane resin in tetrahydrofuran, 171.2 parts of a 20% strength solution, in tetrahydrofuran, of a polyphenoxy resin obtained from bisphenol A and epichlorohydrin and containing 6% by weight of hydroxyl groups, 30 parts of a 0.1% strength solution of silicone oil in tetrahydrofuran, and a further 627 parts of tetrahydrofuran were added, and milling was continued for a further 24 hours.

The dispersion was then removed from the mill and was brought to a processing viscosity of 22 mPa.s. To do this, 600 parts of tetrahydrofuran were stirred into 1000 parts of the dispersion for 15 minutes, 95.8 parts of a 50% strength solution of an isocyanate resin, obtained from 1 mole of trimethylolpropane and 3 moles of toluylene diisocyanate, in ethyl acetate, being stirred in over the same period in order to effect crosslinking of the layer after application. The dispersion was filtered through a paper filter and then applied to a 15 μm thick polyethylene terephthalate film by means of a knife-coater, and the applied layer was then dried in a tunnel dryer. The resulting thickness of the backing coating was 0.9 μm for a 15 μm wide casting gap. The shrinkage factor was thus 16.6. The applied backing coating was very uniform and did not exhibit any casting lines. Further processing was carried out by subsequently applying the magnetic layer in a conventional manner to that side of the film opposite the backing coating. After calendering, the coated material was slit into ½" wide tapes. The number of tape errors, namely the number of drops in the signal level of 20 dB lasting more than 15 μsec, per minute, was determined using a VHS recorder. The result is shown in the Table.

EXAMPLE 2

The procedure described in Example 1 was followed, except that, instead of the 8% strength nitrocellulose solution having a K value of 110, a 5% strength nitrocellulose solution having a K value of 130 was employed. This dispersion had a viscosity of 713 mPa.s and a yield value of 45.9 Pa. When dispersing was complete, the backing coating dispersion was brought to a processing viscosity of 20 mPa.s. To do this, 1000 parts of the dispersion were diluted with 750 parts of tetrahydrofuran, and 90.8 parts of the 50% strength isocyanate resin solution described in Example 1 were added. The backing coating dispersion was applied using a knife-coater, a 0.6 μm thick dry layer being obtained with a 15 μm wide casting gap. The shrinkage factor was thus 25. The applied backing coating was once again found to be very uniform. Application of the magnetic layer, tape production and testing were carried out as described in Example 1. The result is shown in the Table.

EXAMPLE 3

The procedure described in Example 1 was followed, except that 96.2 parts of the 13% strength solution of the linear polyesterurethane resin, 122.6 parts of a 13% strength solution of a polyvinylformal resin having a K value of 70, 375 parts of the 5% strength nitrocellulose having a K value of 130 and 428.4 parts of tetrahydrofuran were introduced into the mill, and milling was carried out for 4 days. The viscosity was 729 mPa.s and the yield value was 39.9 Pa. This batch was then mixed with 869.2 parts of the 13% strength solution of the polyesterurethane resin, 156.9 parts of the 20% strength solution of the polyphenoxy resin, 30 parts of the 0.1% strength solution of silicone oil in tetrahydrofuran, and 608.3 parts of tetrahydrofuran, and milling was continued for a further 24 hours. When dispersing was over, the backing coating dispersion was brought to a processing viscosity of 22.5 mPa.s. To do this, 1000 parts of the dispersion were diluted with 1000 parts of tetrahydrofuran, and 89.6 parts of the above isocyanate resin solution were added. The backing coating was applied using a knife-coater. A 0.7 μm thick dry layer was obtained using a 20 μm wide casting gap; this corresponds to a shrinkage factor of 28.5. The applied backing coating was very homogeneous. Application of the magnetic layer, tape production and testing were carried out as described in Example 1. The result is shown in the Table.

COMPARATIVE EXPERIMENT 1

Using a procedure similar to that described in Example 1, a dispersion was prepared with the binders disclosed in German Pat. No. 2,500,546, namely a linear polyesterurethane obtained from adipic acid, butane-1,4-diol and 4,4'-diisocyanatodiphenylmethane and a polyphenoxy resin obtained from bisphenol A and epichlorohydrin, and the additives and solids specified in Example 1. Furthermore, 363 parts of the 13% strength solution of the linear polyesterurethane resin and 360 parts of tetrahydrofuran were added, and milling was then carried out for 4 days. The viscosity of the resulting dispersion was 105.4 mPa.s and the yield value was 51.4 Pa. 187.7 parts of the 13% strength solution of the linear polyesterurethane resin, 187.7 parts of the 20% strength solution of the polyphenoxy resin, 30 parts of the 0.1% strength solution of silicone oil in tetrahydrofuran, and 650 parts of tetrahydrofuran were then added, and milling was continued for a further 24 hours. When dispersing was over, the backing coating dispersion was brought to a processing viscosity of 19 mPa.s. To do this, 1000 parts of the dispersion were diluted with 500 parts of tetrahydrofuran, and 103 parts of the isocyanate resin solution described in Example 1 were added. The backing coating was applied by means of a knife-coater. A 1.1 μm thick dry layer was obtained using a 10 μm wide casting gap; this corresponds to a shrinkage factor of 9. Because of the narrow casting gap, dust from the base material collected under the knife-coater and resulted in the formation of uncoated areas and a large number of casting lines. Application of the magnetic layer and tape production were carried out as described in the Examples above.

For comparison purposes, the number of errors exhibited by a selected piece of tape was determined. The result is shown in the Table.

COMPARATIVE EXPERIMENT 2

As described in Example 1, a polyethylene terephthalate film was provided with a magnetic layer, but a backing coating was not applied. The coated film was tested as described in Example 1, and the result is shown in the Table.

TABLE

|  | Shrinkage factor | Tape errors |
|---|---|---|
| Example 1 | 16 | 10 |
| Example 2 | 25 | 8 |
| Example 3 | 28.5 | 5 |
| Comparative Experiment 1 | 9 | 20 |
| Comparative Experiment 2 | — | 50 |

We claim:

1. A process for the production of a magnetic recording medium which has a thin backing coating and consists of a non-magnetic flexible base and a magnetic layer which is applied to one side of the base and comprises magnetic material finely dispersed in an organic binder, by applying a dispersion of finely divided non-magnetizable conductive and non-conductive solids and conventional additives in a solution of a polymeric binder in an organic solvent to that side of the base which is opposite the magnetic layer by means of a knife-coater, and then drying the layer, wherein from 3 to 30% by weight, based on the amount of polymeric binder, is a high molecular weight organic compound based on a cellulose reaction product having a K value greater than 75, and wherein the dispersion has a viscosity of from 15 to 200 mPa.s and a solid/solvent ratio of from 1:25 to 1:40, which compound causes the dispersion to exhibit elasticoviscous to thixothropic flow behavior.

2. The process of claim 1, wherein the high molecular weight organic compound is formed by reacting a cellulose reaction product with a di- or polyisocyanate, and has a K value greater than 90.

3. The process of claim 2, wherein the organic compound has a K value of from 100 to 200.

* * * * *